United States Patent
Suh (10) Patent No.: US 8,822,102 B2
(45) Date of Patent: Sep. 2, 2014

(54) MANIFOLD DEVICE FOR TUBE TYPE SOLID OXIDE FUEL CELL

(75) Inventor: Jun-Won Suh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 508 days.

(21) Appl. No.: 12/923,433

(22) Filed: Sep. 21, 2010

(65) Prior Publication Data

US 2011/0117473 A1    May 19, 2011

(30) Foreign Application Priority Data

Nov. 17, 2009   (KR) .................. 10-2009-0110772

(51) Int. Cl.
 *H01M 8/04*   (2006.01)
 *H01M 8/24*   (2006.01)

(52) U.S. Cl.
 USPC ............ 429/488; 429/479; 429/495; 429/497

(58) Field of Classification Search
 None
 See application file for complete search history.

(56) References Cited

U.S. PATENT DOCUMENTS

| | | | |
|---|---|---|---|
| 4,402,345 A * | 9/1983 | Twort | 138/149 |
| 6,379,485 B1 * | 4/2002 | Borglum | 156/89.11 |
| 7,566,510 B2 | 7/2009 | Song et al. | |
| 2005/0112452 A1 * | 5/2005 | Crumm et al. | 429/44 |
| 2006/0051642 A1 | 3/2006 | Finnerty | |
| 2009/0016953 A1 | 1/2009 | Weil et al. | |

FOREIGN PATENT DOCUMENTS

| | | |
|---|---|---|
| JP | 2004-119300 A | 4/2004 |
| JP | 2005-216579 A | 8/2005 |
| KR | 10-0681007 B1 | 2/2007 |

OTHER PUBLICATIONS

Korean Notice of Allowance in KR 10-2009-0110772, dated May 4, 2011 (SUH).

* cited by examiner

*Primary Examiner* — Alix Echelmeyer
(74) *Attorney, Agent, or Firm* — Lee & Morse, P.C.

(57) ABSTRACT

A manifold device for a tube type solid oxide fuel cell including a manifold body including at least one of a first opening for fluid inflow and a second opening for fluid outflow; at least one of a first manifold unit in the manifold body, the first manifold unit distributing fluid flowing in the first opening portion into channels, and a second manifold unit in the manifold body, the second manifold unit integrating fluid flowing in channels out to the second opening; and a plurality of tube type ports, each tube type port having a tube type body contacting and protruding from an outer surface of the manifold body, being connected to and in fluid communication with the channels, and including a heat interception unit in a portion of the tube type body.

20 Claims, 7 Drawing Sheets

MANIFOLD DEVICE FOR TUBE TYPE SOLID OXIDE FUEL CELL

BACKGROUND

1. Field

Embodiments relate to a manifold device for a tube type solid oxide fuel cell.

2. Discussion of Related Art

A tube type solid oxide fuel cell may be superior to a flat type solid oxide fuel cell in terms of lifespan, thermal cycle, and pressurizing operability. In order to manufacture a power generation system having a desired output using the tube type solid oxide fuel cell, a bundle, a module, or a stack should be configured by properly arranging or laminating a plurality of cylindrical cells.

In order to manufacture a stack including, e.g., hundreds of cylindrical cells, bundles or stacks of several to dozens of cylindrical cells may be arranged or laminated such that a plurality of bundles or stacks may form a module. The bundles or stacks may include a manifold for distributively supplying fuel or oxidant to each of the cylindrical cells.

SUMMARY

Embodiments are directed to a manifold device for a tube type solid oxide fuel cell, which represents advances over the related art.

It is a feature of an embodiment to provide a manifold device capable of shortening a working time of brazing-joining the cylindrical cell and a manifold and improving a brazing process yield.

At least one of the above and other features and advantages may be realized by providing a manifold device for a tube type solid oxide fuel cell including a manifold body including at least one of a first opening for fluid inflow and a second opening for fluid outflow; at least one of a first manifold unit in the manifold body, the first manifold unit distributing fluid flowing in the first opening portion into channels, and a second manifold unit in the manifold body, the second manifold unit integrating fluid flowing in channels out to the second opening; and a plurality of tube type ports, each tube type port having a tube type body contacting and protruding from an outer surface of the manifold body, being connected to and in fluid communication with the channels, and including a heat interception unit in a portion of the tube type body.

The manifold device may include the first manifold unit and the second manifold unit.

The heat interception unit may include a bottom groove at an end of the tube type body contacting the manifold body.

The heat interception unit may further include a thermal insulating material in the bottom groove.

The tube type port may have a hollow interior portion, and the bottom groove may surround the hollow interior portion of the tube type port and may have a ring shape.

The heat interception unit may further include a side groove on an outer surface of the tube type port.

The heat interception unit may further include a thermal insulating material in the side groove.

The heat interception unit may further include a thermal insulating material in the bottom groove.

A thickness of a portion of the tube type port including the side groove may be less than a thickness of a portion of the tube type port not including the side groove.

The heat interception unit may include a side groove on an outer surface of the tube type port.

The heat interception unit may further include a thermal insulating material in the side groove.

The side groove may include an upper side groove and a lower side groove, the upper side groove and the lower side groove being spaced apart from each other.

A thickness of portions of the tube type port including the side grooves may be less than a thickness of a portion of the tube type port not including the side grooves.

The heat interception unit may include an internal groove within the tube type port.

The heat interception unit may further include a thermal insulating material in the internal groove.

The tube type port may have a hollow interior portion and the internal groove may have a ring shape surrounding the hollow interior portion.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0110772, filed on Nov. 17, 2009, in the Korean Intellectual Property Office, and entitled: "Manifold Device for Tube Type Solid Oxide Fuel Cell" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

When an element is referred to as being "connected to" another element, it can be directly connected to the another element or be indirectly connected to the another element with one or more intervening elements interposed therebetween.

In describing the embodiment, well-known functions or constructions will not be described in detail since they may unnecessarily obscure the understanding of the embodiments.

Figure 1:
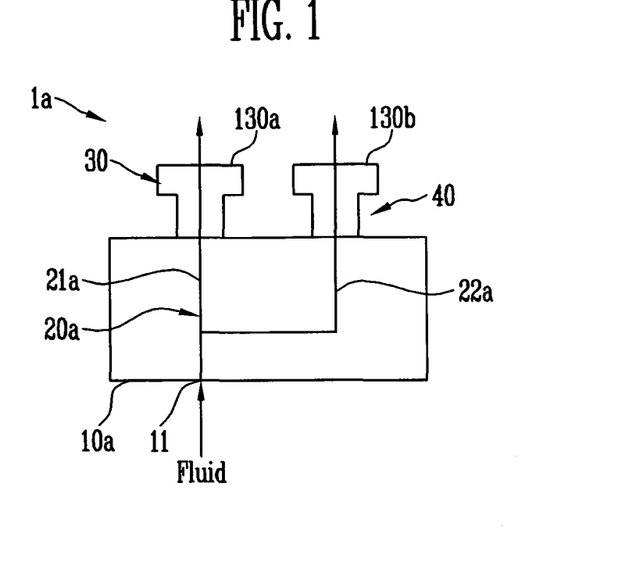
FIG. 1 illustrates a schematic configuration diagram of a manifold device according to an embodiment.

FIG. 1 illustrates a schematic configuration diagram of a manifold device according to an embodiment.

Referring to FIG. 1, the manifold device 1a may include a body 10a, a manifold unit 20a, a plurality of ports 30, and a heat interception unit 40.

The body 10a may include an opening 11 for fluid inflow. The manifold unit 20a may be disposed in the body 10a and may include a plurality of channels 21a and 22a that distributes the fluid flowing in the opening 11 from a single fluid flow into a plurality of fluid flows.

The plurality of ports 30 may include, e.g., a first port 130a and a second port 130b, respectively connected to the plurality of channels 21a and 22a. Each port may have a tube shape that protrudes from an outer surface of the body 10a.

Figure 3:
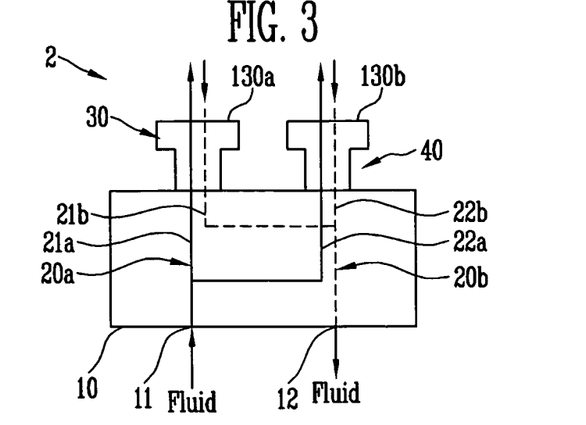
FIG. 3 illustrates a schematic configuration diagram of a manifold device according to yet another embodiment.
Figure 4:
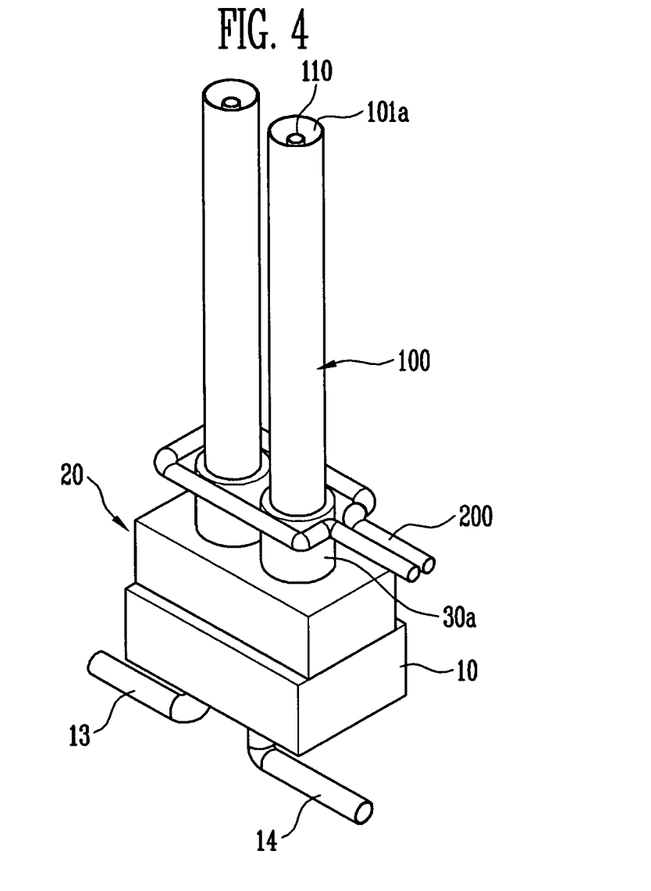
FIG. 4 illustrates a schematic perspective view of a brazing joining process of a manifold device and tube type cells of an embodiment.

The heat interception unit 40 may reduce heat transferred to the body 10a from a joining portion 120 (see FIG. 5) during brazing-joining of the port 30 and a tube type solid oxide fuel cell 100 (see FIG. 4). The heat interception unit 40 may be substantially the same as a heat interception unit to be described below referring to FIG. 3.

Figure 2:
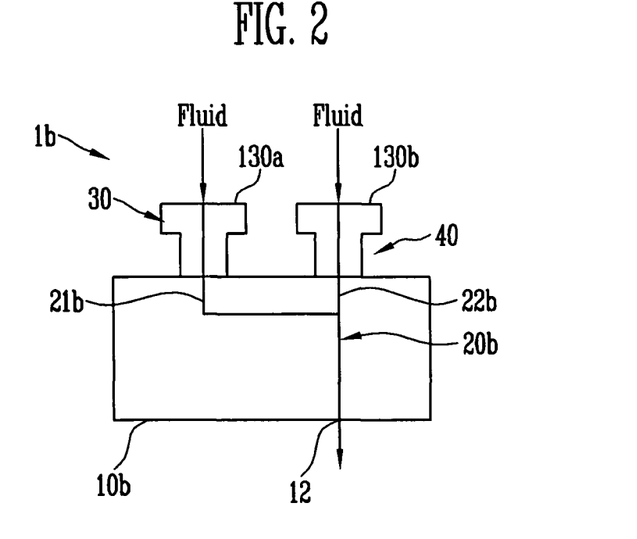
FIG. 2 illustrates a schematic configuration diagram of a manifold device according to another embodiment.

FIG. 2 illustrates a schematic configuration diagram of a manifold device according to another embodiment.

Referring to FIG. 2, the manifold device 1b may include a body 10b, a manifold unit 20b, a plurality of ports 30, and a heat interception unit 40.

The body 10b may include an opening 12 for fluid outflow. The manifold unit 20b may be disposed in the body 10b and may include a plurality of channels 21b and 22b. The manifold unit 20b may integrate fluid flowing in a plurality of channels 21b and 22b from a plurality of fluid inflows into a single fluid flow to discharge the fluid to the opening 12.

The plurality of ports 30 may include, e.g., a first port 130a and a second port 130b, respectively connected to the plurality of channels 21b and 22b. Each port 30 may have a tube shape that protrudes from an outer surface of the body 10b.

The heat interception unit 40 may reduce heat transferred to the body 10b from a joining portion 120 (see FIG. 5) during brazing-joining of the port 30 and a tube type solid oxide fuel cell 100 (see FIG. 4). The heat interception unit 40 may be substantially the same as a heat interception unit to be described below referring to FIG. 3.

FIG. 3 illustrates a schematic configuration diagram of a manifold device according to yet another embodiment.

Referring to FIG. 3, the manifold device 2 may include a body 10, a first manifold unit 20a, a second manifold unit 20b, a plurality of ports 30, and a heat interception unit 40.

The body 10 may include a first opening 11 for fluid inflow and a second opening 12 for fluid outflow. The first manifold unit 20a may be disposed in the body 10 and may include a plurality of channels 21a and 22a that distributes the fluid flowing in the first opening 11 from a single fluid inflow into a plurality of fluid flows. The second manifold unit 20b may be disposed in the body 10 and may include a plurality of channels 21b and 22b. The second manifold unit 20b may integrate fluid flowing in a plurality of channels 21b and 22b from the plurality of fluid inflows into the single fluid flow to discharge the fluid to the second opening 12. The first manifold unit 20a and the second manifold unit 20b may have a two-layer structure in the body 10.

The plurality of ports 30 may include, e.g., a first port 130a and a second port 130b respectively connected to each of the first channels 21a and 22a and each of second channels 21b and 22b. Each port 30 may correspond to a joining unit 120 (see FIG. 5) that connects a tube type cell 100 (see FIG. 4) with the manifold body 10. Each port 30 may have a tube shape protruding from an outer surface of the body 10. Each port 30 that is commonly connected to each first channel 21a and 21b and each second channel 22a and 22b will be described in detail below.

The heat interception unit 40 may reduce heat transferred to the body 10 from a joining portion 120 (see FIG. 5) during brazing-joining of the ports 30 and tube type solid oxide fuel cells 100 (see FIG. 4). The heat interception unit 40 may be disposed in each port 30 and may have a form of a cutaway portion in which a part of the port 30 adjacent to the body 10 is removed. In an implementation, the heat interception unit 40 may surround a hollow portion of the port 30 in a ring shape and may have the form of the cutaway portion reducing an outer diameter, i.e., reducing a thickness, of the tube type port 30. A distance between a center of a cross section and an outer peripheral surface, i.e., a thickness, of the port 30 may be reduced to approximately ½ by the heat interception unit 40. In other words, the thickness of portions of the port 30 including the heat interception unit 40 may be, e.g., about half as thick, as the thickness of portions of the port 30 not including the heat interception unit 40. An air layer may be formed at the cutaway portion.

In an implementation, the heat interception unit 40 may be formed by charging a material having lower thermal conductivity than the port 30 in a portion where a portion of the port 30 is removed. For example, the heat interception unit 40 may be formed by inserting a thermal insulating layer of a thermal insulating material into the cutaway portion. The thermal insulating material may include, e.g., fiberglass, polyurethane, etc.

The above-mentioned heat interception unit 40 will be described in more detail below.

Figure 5:
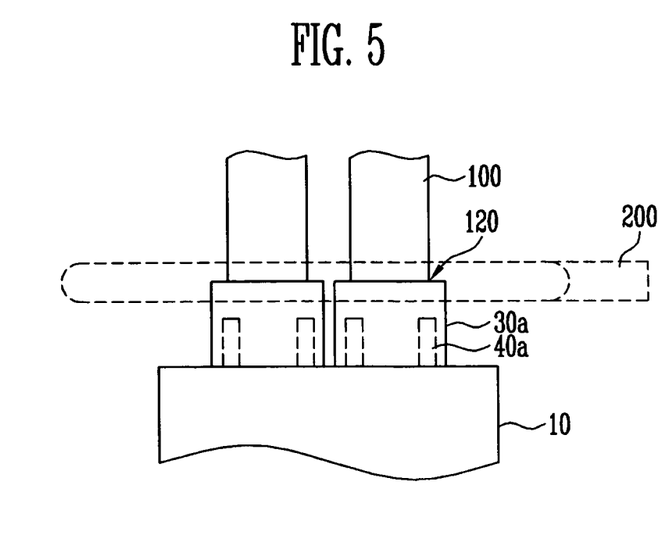
FIG. 5 illustrates a schematic partial enlarged front view of a joining portion of FIG. 4.
Figure 6:
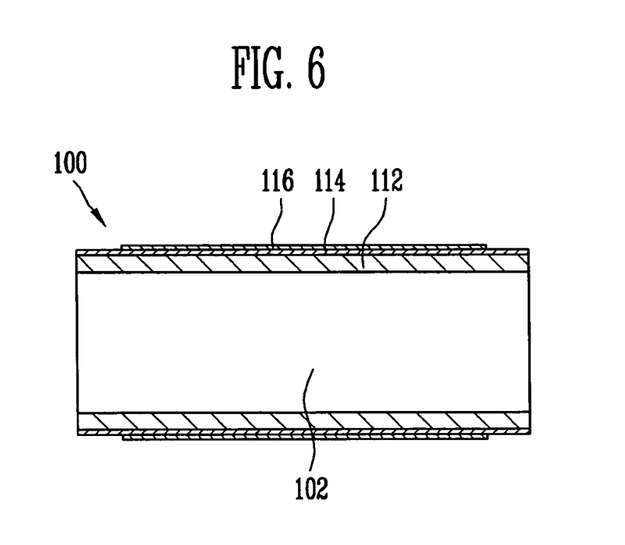
FIG. 6 illustrates a schematic partial cross-sectional view of a tube type solid oxide fuel cell that may be coupled to a manifold device of the embodiment.

FIG. 4 illustrates a schematic perspective view of a stage in a brazing joining process of a manifold device and tube type cells of an embodiment. FIG. 5 illustrates a schematic partial enlarged front view of a joining portion of FIG. 4. In FIG. 5, an induction coil is indicated by a dotted line for convenience of illustration. FIG. 6 illustrates a schematic partial cross-sectional view of a tube type solid oxide fuel cell, which may be coupled to a manifold device of the embodiment.

Referring to FIGS. 4 and 5, a tube type cell 100 may be coupled to each port 30a of a manifold device. The port 30a and the tube type cell 100 may be joined to each other by, e.g., brazing.

Brazing is a method of connecting two base materials by adding filler metal having a melting point lower than the two base materials to be connected, e.g., about 450° C. or higher. Brazing may connect, e.g., homogeneous metals or heterogeneous metals, without adversely affecting the base materials.

In the brazing joining process, when a joining portion 120 of two base materials reaches brazing temperature, the filler metal (not illustrated) added to the joining portion 120 of the base materials may melt, thereby flowing into a joint gap of the base materials due to capillary action.

The filler metal may include a material with affinity for the base materials. A degree of the affinity may be expressed as wetting of the filler metal for the base materials. In an implementation, e.g., BAu-based, BAlSi-based, BNi-based, BMg-based materials, may be used as the filler metal due to ideal wetting characteristics thereof.

By contrast, if the wetting of the filler metal is inferior, the filler metal may not adequately join with the base materials to be brazed. Further, when the joint gap between the base materials is large, or the filler metal is not completely melted, the filler metal may not be completely charged in the joint gap, such that incomplete joining or a brazing joining error may occur.

In the present embodiment, an induction brazing method may be used so as to avoid damaging the base materials. Induction brazing may include partially increasing the temperature of only the joining portion 120 of the base materials. By using the induction brazing, when the tube type solid oxide fuel cell 100 is exposed to high temperature, it is possible to prevent an undesirable change in porosity caused by particle growth in the tube type cell 100.

Referring to FIG. 6, the tube type cell 100 may include, e.g., a first electrode 112 having a hollow portion 102 and forming a tube type support. The tube type cell 100 may further include, e.g., an electrolyte layer 114 and a second electrode 116 sequentially laminated on an outer surface of the first electrode 112. In an implementation, the first electrode 112 may be an anode and the second electrode 116 may be a cathode. The electrolyte may be, e.g., a ion conductive polymer that conducts protons or oxygen ions.

Referring back to FIGS. 4 and 5, the manifold device of an embodiment may also include the heat interception unit 40a in each port 30a to prevent heat energy from the brazing process from being easily transferred to the metallic manifold body 10. Preventing the transfer of heat energy may advantageously shorten the brazing process time and improve yield. The heat interception unit 40a and a modified example thereof will be described in more detail below.

Figure 7:
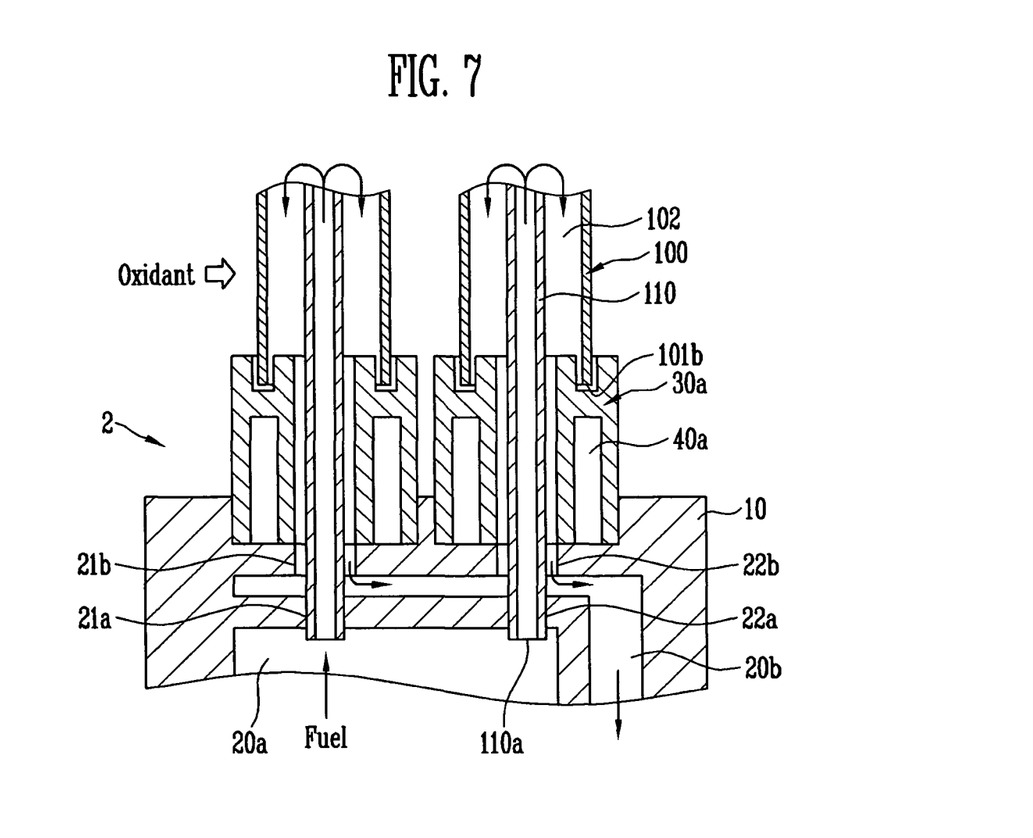
FIG. 7 illustrates a partial cross-sectional view of a manifold device according to an embodiment.

FIG. 7 illustrates a partial cross-sectional view of a manifold device according to an embodiment. The cross section of FIG. 7 may correspond to the cross section of the joining portion of FIG. 5.

Referring to FIG. 7, the manifold device 2 may include a manifold body 10, first and second manifold units 20a and 20b in the manifold body 10, and a plurality of tube type ports 30a connected to the manifold body 10. One end 101b of the tube type cell 100 in a longitudinal direction may be connected to each port 30a. The other end (see 101a of FIG. 4) of the tube type cell 100 in the longitudinal direction may be closed by a cover.

The manifold device 2 of the present embodiment may prevent heat applied to the joining portion (see 120 of FIG. 5) of the port 30a and the tube type cell 100 at the time of brazing-joining from being easily transferred to the manifold body 10 due to the heat interception unit 40a. A filler metal (not illustrated) may be filled between the port 30a and the tube type cell 100 that are brazing-joined to each other.

In the present embodiment, the heat interception unit 40a may be disposed at a side of the port 30a adjacent to the manifold body 10 in the form of, e.g., a cutaway portion or a bottom groove. The heat interception unit 40a may surround the hollow portion of the tube type port 30a in a ring shape. In an implementation, a thermal insulating material may be disposed in the heat interception unit 40a.

A channel extension unit 110 connected to each of the first channels 21a and 22a of the first manifold unit 20a and extending outside of the manifold body 10 (e.g., the hollow portion of the tube type cell 100 in a longitudinal direction) crossing the first channels 21a and 22a and the second channels 21b and 22b may be coupled to the manifold device 2. The channel extension unit 110 may be connected to and in fluid communication with each of the first channels 21a and 22a prior to joining the port 30a and the tube type cell 100.

The channel extension unit 110 may be, e.g., a pipe having an opening at both ends that supplies fuel or an oxidant to the cell 100.

A solid oxide fuel cell bundle having, e.g., at least two tube type cells 100, may generate electricity through an electrochemical reaction of the fuel and oxidant. For example, the fuel may be distributed through the first channels 21a and 22a of the first manifold unit 20a of the manifold device 2 and may be supplied to the first electrode (not illustrated) through a hollow portion of the cell 100 from the other end (see 101a of FIG. 4) of each cell 100 by the channel extension unit 110 connected to the first channel. In addition, the fuel may be discharged outside of the manifold body 10 through the second channels 21b and 22b of the second manifold unit 20b along an outer surface of the channel extension unit 110 from the hollow portion of the port 30a. The oxidant may be supplied to the second electrode, which may be laminated on an outer surface of the tube type first electrode with an electrolyte interposed therebetween.

Various fuels, e.g., pure hydrogen, coal gas, natural gas, landfill gas, methanol, gasoline, etc., may be used as the fuel. The oxidant may include, e.g., pure oxygen gas or atmospheric oxygen molecules.

FIGS. 8A to 8H illustrate schematic cross-sectional views of various ports including heat interception units that are suitable for use in a manifold device of an embodiment.

Figure 8A:
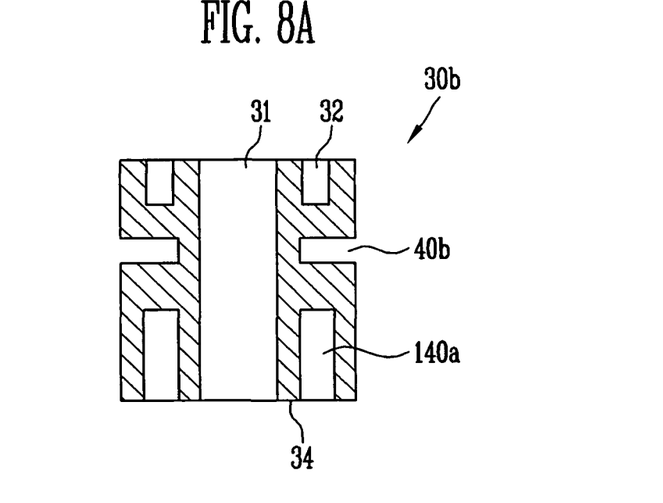
FIGS. 8A to 8H illustrate schematic cross-sectional views of ports that may be used in a manifold device of an embodiment.

Referring to FIG. 8A, a port 30b of the manifold device of an embodiment may have a tube shape having a hollow portion 31 and including a connection portion 32 into which one end (see 101b of FIG. 7) of the tube type cell may be inserted. The hollow portion 31 may form the joining portion (see 120 of FIG. 4) together with the tube type cell. Further, the port 30b may include a heat interception unit for intercepting heat from the connection portion 32 to a side of the port 30b that is in contact with the manifold body during the brazing process.

The heat interception unit of the embodiment may face the connection portion 32 of the port 30b and may include a bottom groove 140a on an end 34 adjacent to the manifold body and a side groove 40b on an outer surface of the port 30b. The side groove 40b may be formed by reducing a distance between the center of a corresponding cross section of the tube type port 30b and an outer peripheral surface, i.e., reducing the thickness, of a side wall of the port 30b.

Figure 8B:
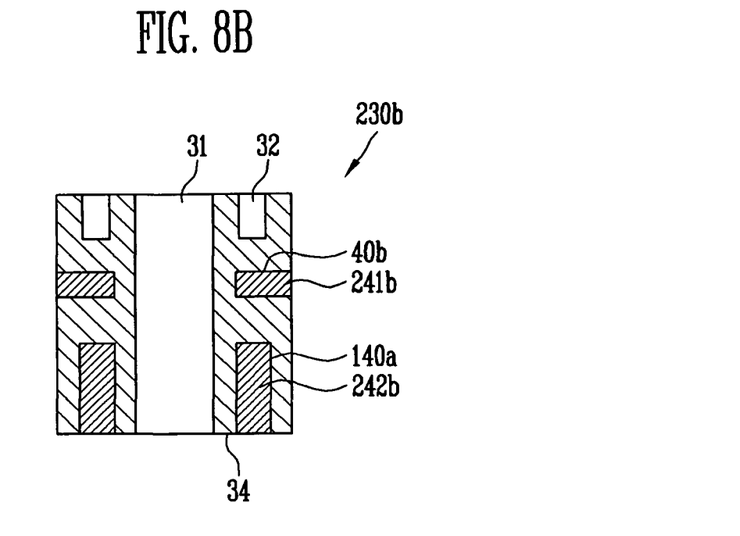

Referring to FIG. 8B, a port 230b of another embodiment may be similar to the port 30b of the previous embodiment except that it may include heat interception units 241b and 242b in which a thermal insulating material is disposed in the bottom groove 140a and the side groove 40b. The heat interception units 241b and 242b including the thermal insulating material may help ensure that it is possible to improve a thermal insulating effect in comparison with other heat interception units having only an air layer in the grooves.

Figure 8C:
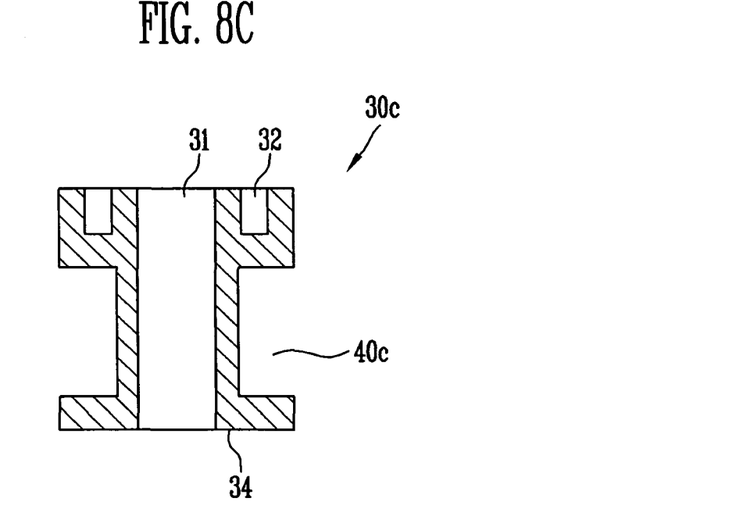

Referring to FIG. 8C, a port 30c of the manifold device of an embodiment may include a heat interception unit including a side groove 40c on a side outer surface of the tube type body. The side groove 40c may reduce a distance between the center of a cross section of the tube type port 30c and an outer peripheral surface, i.e., may reduce a thickness, of a side wall of the port 30c.

Figure 8D:
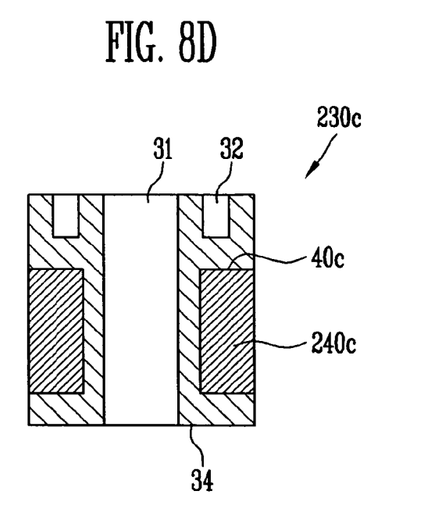

Referring to FIG. 8D, a port 230c of another embodiment may be similar to the port 30c of the previous embodiment except that it may include a heat interception unit 240c in which a thermal insulating material is disposed in a side groove 40c.

Figure 8E:
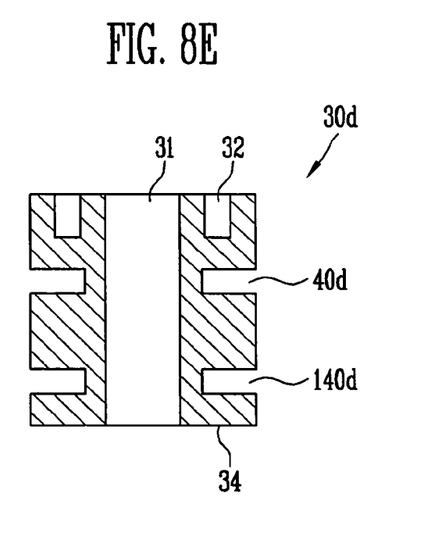

Referring to FIG. 8E, a port 30d of another embodiment may include a heat interception unit including an upper side groove 40d and a lower side groove 140d spaced apart from each other by a predetermined gap on a side outer surface of the port 30*d*. The upper and lower side grooves 40*d* and 140*d* may reduce a distance between the center of a cross sectional of the tube type port 30*d* and an outer peripheral surface thereof, i.e., may reduce a side wall thickness, and may surround a hollow portion 31 of the port 30*d* in a ring shape.

Figure 8F:
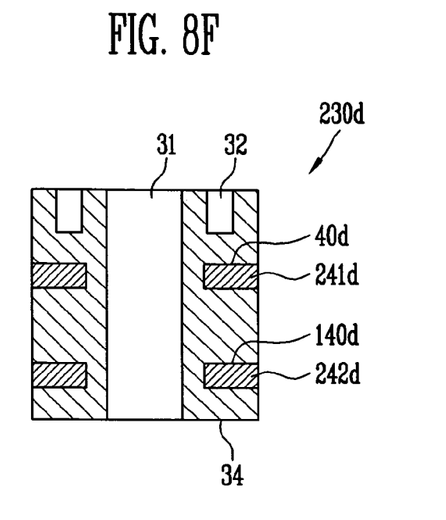

Referring to FIG. 8F, a port 230*d* of another embodiment may be similar to the port 30*d* of the previous embodiment except that it may include heat interception units 241*d* and 242*d* in which a thermal insulating material is disposed in upper and lower side grooves 40*d* and 140*d*.

Figure 8G:
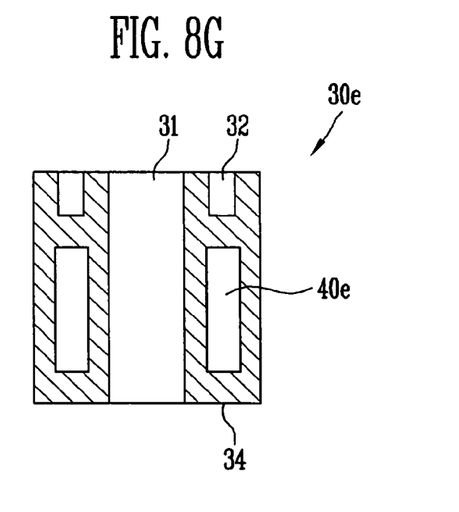

Referring to FIG. 8G, a port 30*e* of another embodiment may include a heat interception unit including an internal groove 40*e* within a side wall of the port 30*e*. The internal groove 40*e* may have a predetermined width and may surround a hollow portion 31 of the tube type port 30*e* in a ring shape.

Figure 8H:
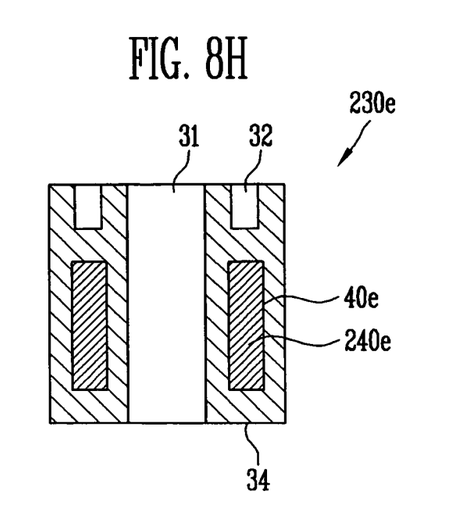

Referring to FIG. 8H, a port 230*e* of another embodiment may be similar to the port 30*e* of the previous embodiment except that it may include a heat interception unit 240*e* in which a thermal insulating material is disposed in an internal groove 40*e*.

Each port of the manifold devices according to the embodiments may reduce a transmission area of thermal energy that may move toward one end 34 of the port 30 from the connection portion 32 and/or may reduce brazing heat energy radiated to the manifold body from the brazing connection portion by, e.g., increasing a transmission length of the thermal energy.

According embodiments, all filler metal may be rapidly molten at a joining portion between a manifold and a tube type cell by reducing loss of heat flowing out to the manifold body through the manifold port, thereby reducing a brazing operation error and shortening a brazing operation time. Thus, it is possible to improve a brazing yield.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A manifold device for a tube type solid oxide fuel cell, comprising:
    a manifold body including at least one of a first opening for fluid inflow and a second opening for fluid outflow;
    at least one of:
        a first manifold unit in the manifold body, the first manifold unit distributing fluid flowing in the first opening into first channels, and
        a second manifold unit in the manifold body, the second manifold unit integrating fluid flowing in the first channels out to the second opening; and
    a plurality of tube type ports, each tube type port:
        having a tube type body contacting and protruding from an outer surface of the manifold body, the tube type body including a second channel therethrough,
        being connected to and in fluid communication with the first channels through the second channel, and
        including at least one heat interception unit in a portion of the tube type body, the heat interception unit being a groove in the tube type body and adjacent to the second channel, the groove defining a space in the tube body type that surrounds the second channel and is separated from the second channel.

2. The manifold device for a tube type solid oxide fuel cell as claimed in claim 1, wherein the manifold device includes the first manifold unit and the second manifold unit.

3. The manifold device for a tube type solid oxide fuel cell as claimed in claim 1, wherein the heat interception unit is a bottom groove at an end of the tube type body contacting the manifold body, the bottom groove contacting the manifold body and extending from the manifold body along a longitudinal direction of the second channel.

4. The manifold device for a tube type solid oxide fuel cell as claimed in claim 3, wherein the tube type port further includes a thermal insulating material in the bottom groove.

5. The manifold device for a tube type solid oxide fuel cell as claimed in claim 1, wherein the groove defines a cavity around an entire perimeter of the second channel and has a ring shape, the cavity and second channel being completely isolated from each other.

6. The manifold device for a tube type solid oxide fuel cell as claimed in claim 3, wherein the tube type port further includes a side groove on an outer surface of the tube type port, the side groove and bottom groove being separated from each other.

7. The manifold device for a tube type solid oxide fuel cell as claimed in claim 6, wherein the tube type port further includes a thermal insulating material in the side groove.

8. The manifold device for a tube type solid oxide fuel cell as claimed in claim 7, wherein the tube type port further includes a thermal insulating material in the bottom groove.

9. The manifold device for a tube type solid oxide fuel cell as claimed in claim 6, wherein a thickness of a portion of the tube type port including the side groove is less than a thickness of a portion of the tube type port not including the side groove.

10. The manifold device for a tube type solid oxide fuel cell as claimed in claim 1, wherein the heat interception unit is a side groove on an outer surface of the tube type port, the side groove extending from the outer surface of the tube type port toward the second channel.

11. The manifold device for a tube type solid oxide fuel cell as claimed in claim 10, wherein the tube type port further includes a thermal insulating material in the side groove.

12. The manifold device for a tube type solid oxide fuel cell as claimed in claim 10, wherein the side groove includes an upper side groove and a lower side groove, the upper side groove and the lower side groove being spaced apart from each other.

13. The manifold device for a tube type solid oxide fuel cell as claimed in claim 12, wherein a thickness of portions of the tube type port including the side grooves is less than a thickness of a portion of the tube type port not including the side grooves.

14. The manifold device for a tube type solid oxide fuel cell as claimed in claim 1, wherein the heat interception unit is an internal groove within the tube type port, the internal groove being a space completely enclosed within the tube type port.

15. The manifold device for a tube type solid oxide fuel cell as claimed in claim 14, wherein the tube type port further includes a thermal insulating material in the internal groove.

16. The manifold device for a tube type solid oxide fuel cell as claimed in claim 1, wherein the groove and the second channel of the tube type body are concentric.

17. The manifold device for a tube type solid oxide fuel cell as claimed in claim 1, wherein only the heat interception unit and the second channel are hollow within the tube type body.

18. The manifold device for a tube type solid oxide fuel cell as claimed in claim 17, wherein the heat interception unit and the second channel are completely separated from each other.

19. The manifold device for a tube type solid oxide fuel cell as claimed in claim 1, wherein a material of the tube type port isolates the heat interception unit from the second channel.

20. The manifold device for a tube type solid oxide fuel cell as claimed in claim 1, wherein the groove is an empty cavity in the tube type body and is exposed to an exterior of the tube type port.

* * * * *